D. & S. Knickerbocker,
Shaft Coupling.
No. 112,817.    Patented Mar. 21, 1871.
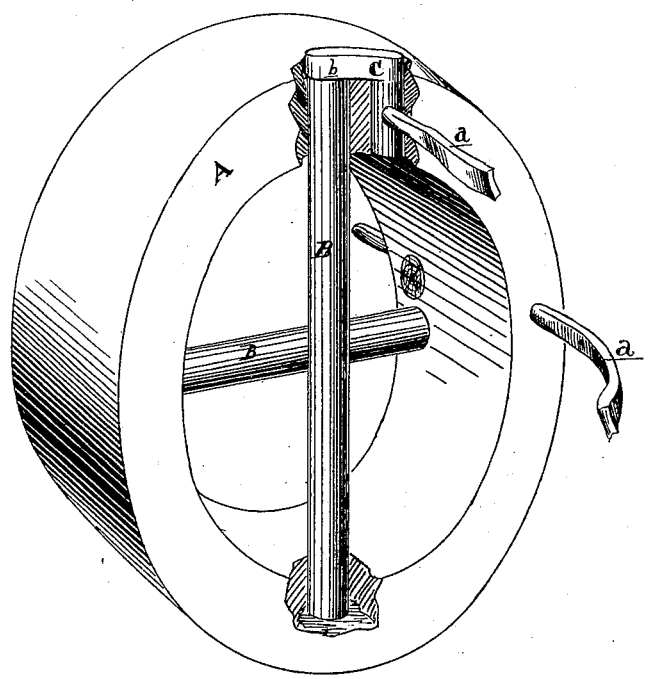
ATTEST
Frederick Eberts
Myron H. Church
INVENTORS
Darius Knickerbocker
Samuel Knickerbocker
per Attorney

United States Patent Office.

DARIUS KNICKERBOCKER AND SAMUEL KNICKERBOCKER, OF ALLEGAN, MICHIGAN.

Letters Patent No. 112,817, dated March 21, 1871.

IMPROVEMENT IN SHAFT-COUPLINGS.

The Schedule referred to in these Letters Patent and making part of the same.

*To whom it may concern:*

Be it known that we, DARIUS KNICKERBOCKER and SAMUEL KNICKERBOCKER, of Allegan, in the county of Allegan and State of Michigan, have invented a new and useful Improvement in a Safety Universal Coupling; and we do declare that the following is a true and accurate description thereof, reference being had to the accompanying drawing and to the letters of reference marked thereon and being a part of this specification, in which our improvement is shown in perspective, partially broken out.

This invention has for its object the construction of universal couplings in such a manner that they will present no projections to catch the clothing of those who may come near them when in motion, and to so secure the pins in place that the coupling cannot come apart.

The invention consists in the peculiar arrangement of the coupling-pins of a universal coupling in a circular metallic rim, and in the manner of securing said pins therein.

In the drawing—

A represents a metallic rim, through which is inserted, near one edge, one of the pins B, entering a socket on the opposite side of the rim, but not extending through it.

The pin does not come out flush with the opening at which it enters, which is elongated, and at the other end has a hole or socket for the reception of a hook-headed plug, C, confined in place by a lateral pin, bolt, or thong of leather, a, passing through it and the rim.

The head b of the bolt overlaps the end of the pin B, and holds it in place, although allowing it an axial movement.

To the pin B is secured the fork of a tumbling-rod, in the usual manner.

The other pin B is similarly arranged at right angles to the first, and secured in place, and is connected to the fork of the connecting tumbling-rod.

The value and necessity of such a coupling as this to tumbling-rods, and more especially to those used about thrashing-machines, so prolific of accidents, need not be recited.

What we claim as our invention, and desire to secure by Letters Patent, is—

The construction and arrangement of the rim A, plugs C, and thongs a, or their equivalents, with relation to each other and the cross-pins B of a universal coupling, in the manner and for the purpose set forth.

DARIUS KNICKERBOCKER.
SAMUEL KNICKERBOCKER.

Witnesses:
ALANSON CASE,
A. H. PATRICK.